(12) United States Patent
Harmon et al.

(10) Patent No.: US 7,963,006 B2
(45) Date of Patent: Jun. 21, 2011

(54) RETAINER FOR OVERMOLDED ELECTRICAL CIRCUIT

(75) Inventors: Darren L. Harmon, Madison, IN (US); Thomas J. Schulz, Hanover, IN (US); William E. Marvell, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 679 days.

(21) Appl. No.: 11/844,887

(22) Filed: Aug. 24, 2007

(65) Prior Publication Data

US 2009/0049661 A1 Feb. 26, 2009

(51) Int. Cl.
*B29C 45/14* (2006.01)

(52) U.S. Cl. ............ 24/115 R; 264/272.15; 264/272.11; 439/639; 439/651; 439/653

(58) Field of Classification Search .......................... None
See application file for complete search history.

(56) References Cited

U.S. PATENT DOCUMENTS

| | | | |
|---|---|---|---|
| 1,517,602 A * | 12/1924 | Trogner | 24/115 R |
| 4,979,908 A | 12/1990 | Brooks et al. | |
| 5,182,032 A | 1/1993 | Dickie et al. | |
| 5,739,592 A | 4/1998 | Rigsby et al. | |
| 5,854,517 A | 12/1998 | Hines | |
| 6,086,413 A | 7/2000 | Karasik et al. | |
| 7,189,103 B1 | 3/2007 | Brown et al. | |
| 2006/0087054 A1 | 4/2006 | Balaschak | |
| 2007/0128923 A1 | 6/2007 | Brown et al. | |

OTHER PUBLICATIONS

Internet pages, Bushing—Wikipedia, the free encyclopedia, http://en.wikipedia.org/wiki/Bushing, 2 pages last printed Jun. 13, 2007.

* cited by examiner

*Primary Examiner* — Jack W. Lavinder
(74) *Attorney, Agent, or Firm* — Woodard, Emhardt, Moriarty, McNett & Henry LLP

(57) ABSTRACT

A device configured to maintain an electric circuit in a fixed position during an overmolding process comprises a wire retainer configured to hold the electric circuit taut and in a fixed position while being molded within a molded item. The retainer has a first end and an opposite second end, and includes a first bushing defining a mounting hole for the molded item extending along a width axis. The built-in bushing includes front and back surfaces configured to be aligned and substantially co-planar with the front and back surfaces of the molded item. The device also includes a first securing member configured to secure a portion of the electric circuit to the retainer within the molded item, to hold the electric circuit in a fixed position within the molded item during the overmolding process.

8 Claims, 5 Drawing Sheets ions exists for positioning 35
RETAINER FOR OVERMOLDED ELECTRICAL CIRCUIT

FIELD OF THE INVENTION

The present invention relates to a retainer for use in overmolding an electrical circuit, and more particularly to a retainer designed to hold the circuit taut and in a fixed position during overmolding of the circuit.

BACKGROUND OF THE INVENTION

It is well known to encapsulate components within a die mold cavity by rigidly affixing the components to or through the walls of the cavity. It some cases it is also desirable to avoid the visibility of fixing or holding devices at the surface of the molded item by providing retractable holding devices which retract either out of the molding cavity or into the molded product while the molding material is "setting up." Such devices and techniques, however, often do not hold the encapsulated component sufficiently taut and in a precisely defined position. In some applications, for example, the molded components must maintain precise positions relative to other molded components or with respect to the exterior surfaces of the molded item. Additionally, some known techniques involve the use of retractable locator pins to hold wires and/or cables in fixed positions during molding processes, leaving behind holes in the molded item upon their retraction which can reduce the integrity of the molded item.

The problem of precisely positioning components within a die mold cavity can be further complicated by two additional factors. If the component to be encapsulated is not rigid, holding it taut and in a fixed position becomes much more difficult. Additionally, the size and shape of the molded item may be such that very little clearance exists for positioning the molded components away from the interior surfaces of the die mold (and thus the exterior surfaces of the molded item). If the components are not precisely and firmly positioned in the interior of the molding cavity, some of the components may be visible at or even extend through the exterior surfaces of the molded item. Such component breakout may be grounds for rejecting the product. In the specific case of wires and/or cables, without properly and sufficiently maintaining the wires and/or cables in fixed positions, they often will float or shift during the molding process which may result in the wires and/or cables being visible at the exterior surfaces of the molded item.

Additionally, typical molding processes often produce molded items which are difficult to mount because the processes have provided no suitable mechanism to mount the items.

There is therefore a need for a retainer for an overmolded electrical circuit. The present disclosure is directed toward devices and methods which meet these needs.

SUMMARY OF THE INVENTION

In one aspect of the present disclosure, a device configured to maintain an electric circuit in a fixed position during an overmolding process comprises a wire retainer configured to hold the electric circuit in a fixed position while being molded within a molded item. The retainer has a first end and an opposite second end, and includes a first bushing defining a mounting hole for the molded item extending along a width axis. The built-in bushing includes front and back surfaces configured to be aligned and substantially co-planar with the front and back surfaces of the molded item. The device further includes a first securing member configured to secure a portion of the electric circuit to the retainer within the molded item to hold the electric circuit in a fixed position within the molded item during the overmolding process.

In another aspect of the present disclosure, a plug assembly comprises a molded plug, a retainer, first and second wire sets and first and second securing members. The molded plug includes opposing first and second ends and opposing front and back surfaces, with the plug extending along a longitudinal axis. The plug includes a socket extending from the front surface at least partially through the plug along a width axis, with the socket defining at least two holes extending therethrough. The retainer is at least partially molded within the plug, and has a first end adjacent the first end of the plug and a second end adjacent the second end of the plug. Additionally, the wire sets extend into the plug and are connected to the socket within the plug. The first securing member secures the first wire set to the retainer within the plug, adjacent the first end of the retainer, and the second securing member secures the second wire set to the retainer within the plug, adjacent the second end of the retainer. The securing members hold the first and second wire sets in fixed positions within the plug during the overmolding process.

In yet another aspect of the present disclosure, a method comprises providing an electric circuit and providing a retainer configured to hold the electric circuit taut and in a fixed position within a cavity of a molding die during overmolding of a portion of the electric circuit to form a molded item. The retainer includes at least one built-in bushing defining a hole extending through the retainer. Additionally, the retainer is configured to remain permanently molded within the molded item. The method further comprises permanently attaching the electric circuit to the retainer with at least one securing member and overmolding at least a portion of the electric circuit and the retainer to form the molded item containing a portion of the electric circuit and the retainer.

DESCRIPTION OF THE ILLUSTRATED EMBODIMENTS

Figure 1:
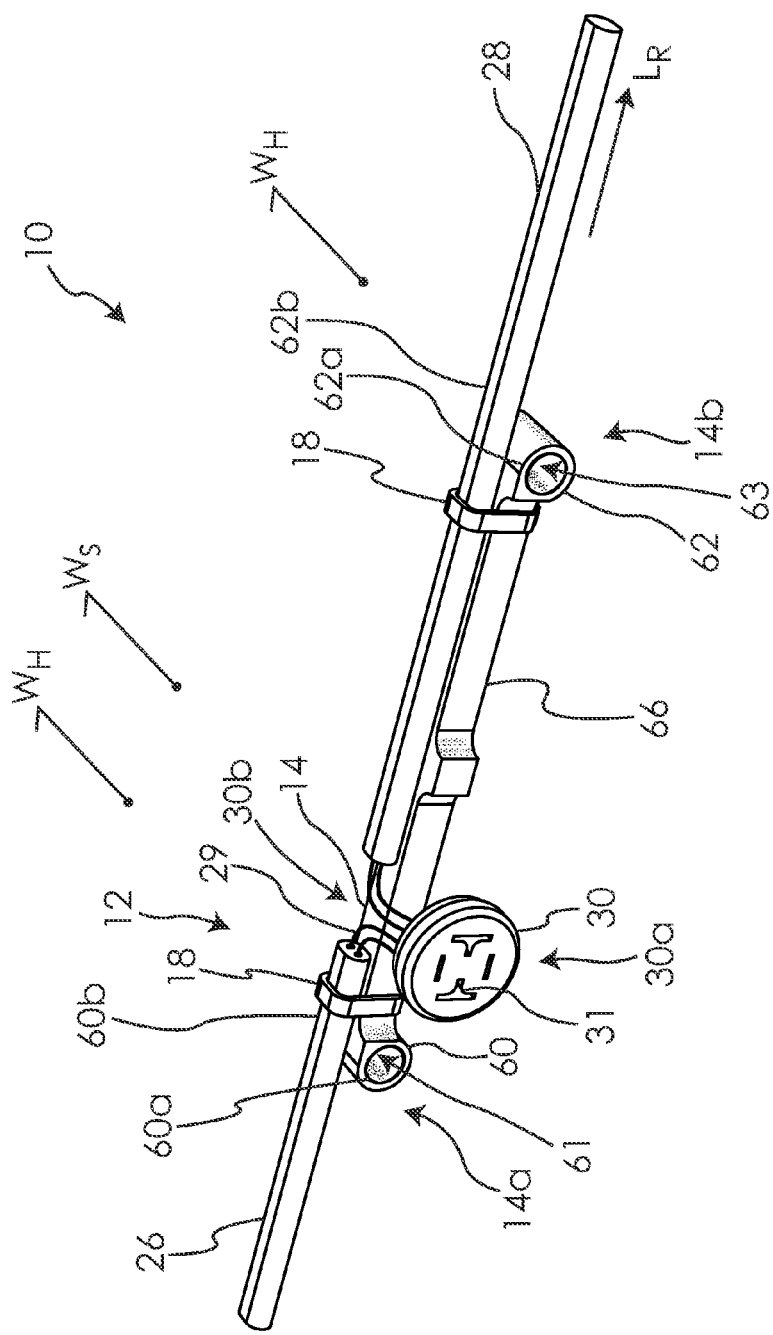
FIG. 1 is a perspective view of components of a molded assembly according to an embodiment of the present invention.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, and alterations and modifications in the illustrated systems, and further applications of the principles of the disclosure as illustrated therein are herein contemplated as would normally occur to one skilled in the art to which the disclosure relates.

The present disclosure is directed to an assembly including a retainer designed to hold an electric circuit taut and in a fixed position during overmolding of the circuit. The electric circuit is attached to the retainer via a securing member, such as a wire tie as an example. The retainer and the electric circuit may be molded within a mold cavity of a die to form a molded plug. Additionally, the retainer includes at least one built-in bushing defining a hole through the retainer and the molded plug to allow for mounting of the plug.

Referring generally to FIGS. 1-5, there is shown an embodiment of an assembly 10 including an electric circuit 12 and a retainer 14 molded within a plug 16. Retainer 14 is configured to hold electric circuit 12 taut and in a fixed position during the overmolding process to create plug 16. In the illustrated embodiment, securing members such as wire ties 18 are used to attach electric circuit 12 to retainer 14. Additionally, assembly 10 includes a socket 30 operably connected with circuit 12 to form the electric plug component of plug 16. For illustration purposes, plug 16 is shown as transparent in FIG. 2 to better illustrate the various other components of assembly 10; however, it should be appreciated that plug 16 may or may not be transparent. Additionally, plug 16 is absent from FIG. 1 as the remaining components may be molded within various other items, as discussed below.

In the illustrated embodiment, electric circuit 12 includes two wire sets 26 and 28 entering plug 16 at opposite ends and extending to socket 30. In certain embodiments, wire sets 26 and 28 each include a cable or outer sheath surrounding wires 29. As illustrated, there may be two such wires 29 positioned in each cable. However, it is contemplated that there may be more or less wires within electric circuit 12 as would occur to one skilled in the art. It should be appreciated that electric circuit 12 can be otherwise configured with various other electrical components, only one of the numerous possible examples being illustrated.

Socket 30 includes a front end 30a, a back end 30b and extends along a width axis $W_S$ from outside of plug 16 at least partially therethrough. As illustrated, wires 29 within wire sets 26 and 28 may extend to and be electrically connected with back end 30b of socket 30. Socket 30 defines holes 31 in front end 30a which extend at least partially through the socket and are configured to receive electrical connectors. In certain embodiments, the number of holes 31 in front end 30a parallels the number of wires 29 within plug 16. Accordingly, in the illustrated embodiment, there are four holes 31 corresponding to the four wires 29. Additionally, socket 30 may be connected to a component of system 10, such as retainer 14 as an example. Accordingly, socket 30 may be secured to retainer 14 via fasteners such as screws or bolts.

Figure 2:
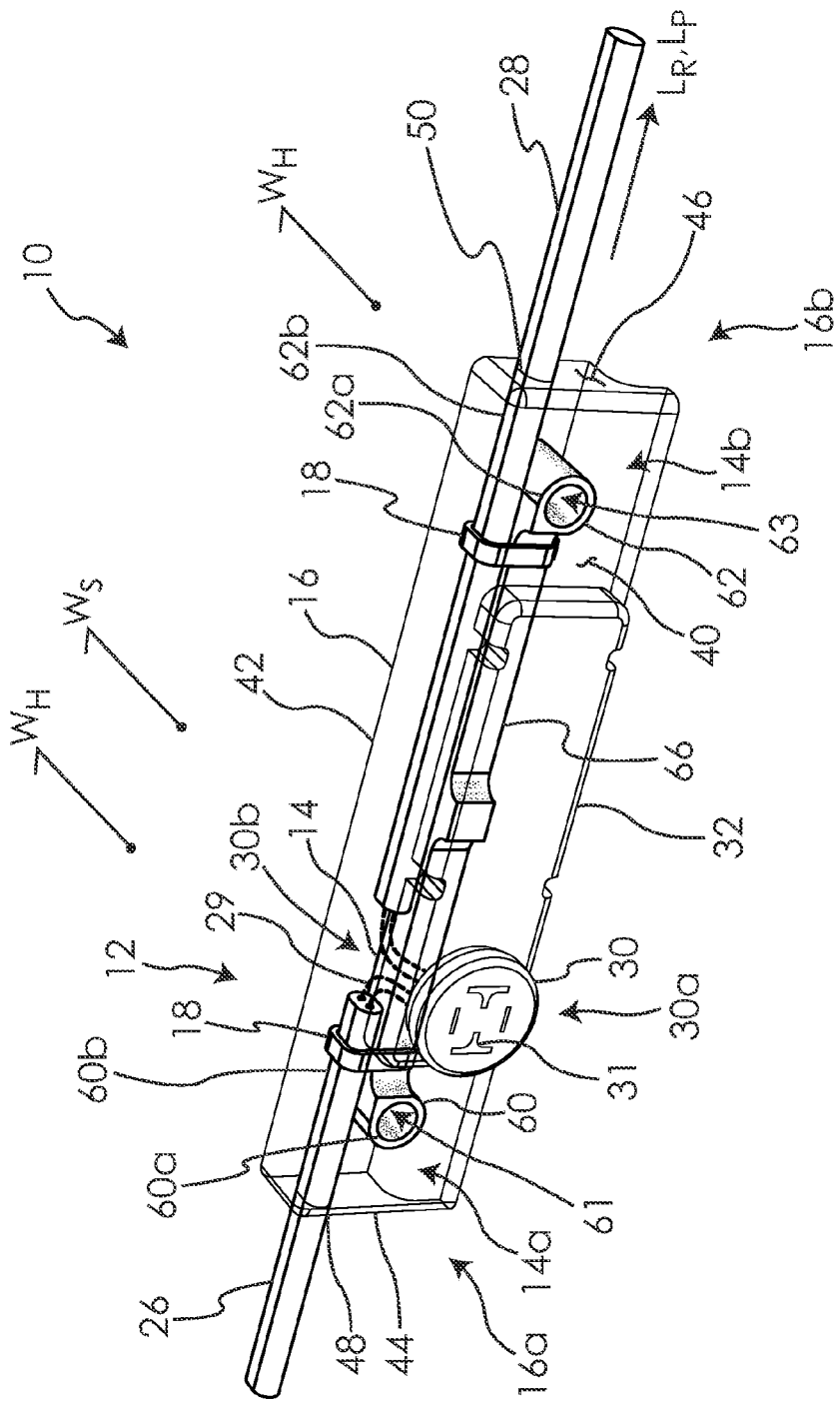
FIG. 2 is a perspective view of a molded assembly according to an embodiment of the present invention, with one component shown as transparent to enable visibility of other components.
Figure 3:
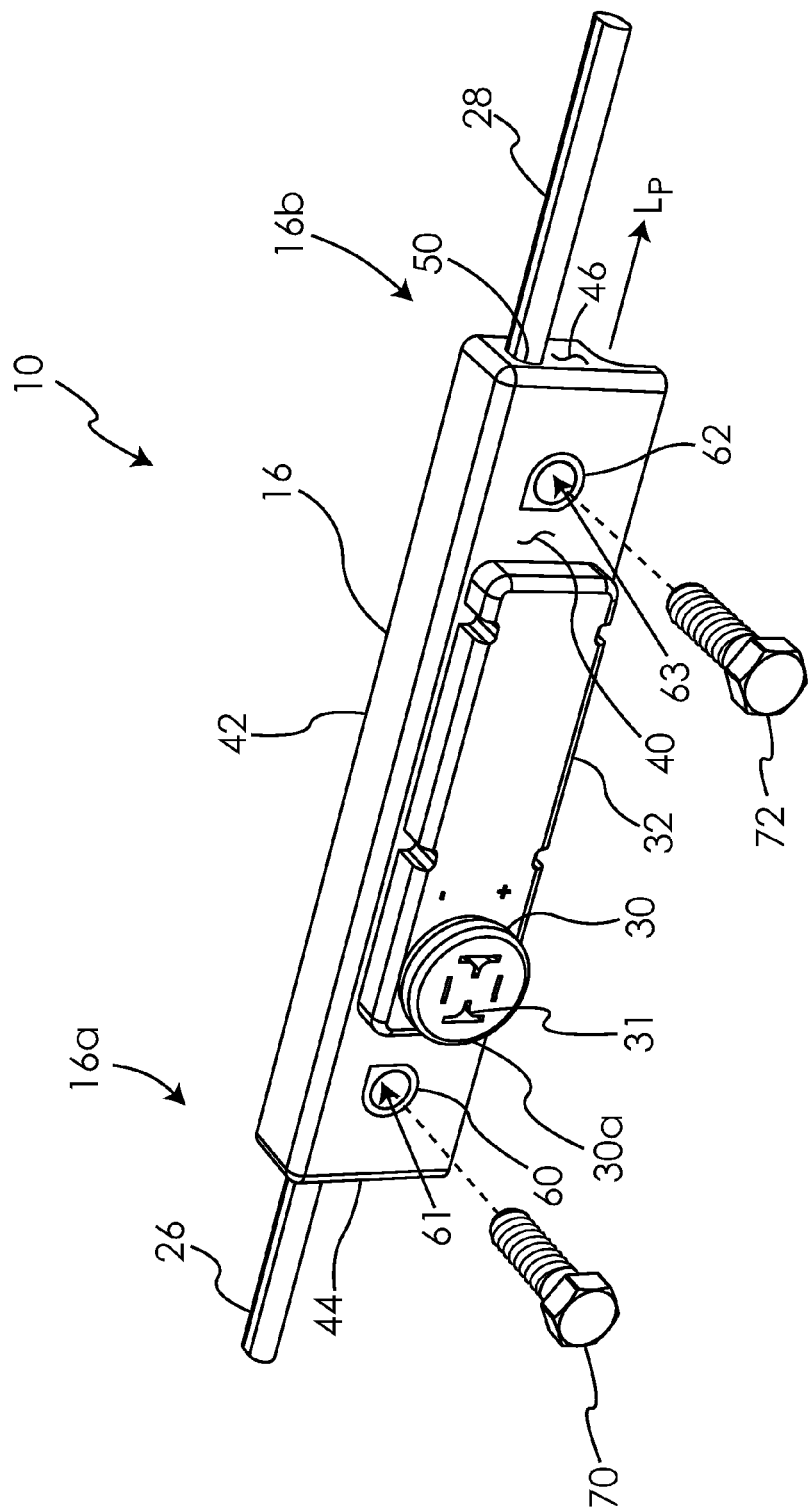
FIG. 3 is a perspective view of the molded assembly according to the embodiment of FIG. 2.

Retainer 14, as best illustrated in FIG. 2, may include a first built-in bushing 60 adjacent a first end 14a and a second built-in bushing 62 adjacent a second end 14b. Bushings 60 and 62 define holes 61 and 63, respectively, extending through retainer 14 and plug 16 along width axis $W_H$. Holes 61 and 63 are configured to receive mounting fasteners such as mounting bolts 70 and 72 as examples (see FIG. 3) to mount plug 16. Built-in bushings 60 and 62 include front surfaces 60a and 62a and back surfaces 60b and 62b, respectively. In the illustrated embodiment, retainer 14 includes a longitudinal portion 66 extending between bushings 60 and 62 along a longitudinal axis $L_R$. In certain embodiments, longitudinal axis $L_R$ of longitudinal portion 66 may be substantially perpendicular to width axis $W_H$ of holes 61 and 63. Additionally, in the illustrated embodiment, the widths of bushings 60 and 62 are substantially equal and are larger than the width of longitudinal portion 66, such that portion 66 is of reduced-height. However, it should be appreciated that retainer 14 can be shaped and sized differently, with only one example configuration being illustrated in the accompanying figures. In certain embodiments, retainer 14 is composed of a plastic material. However, retainer 14 may be made from other materials as desired or deemed necessary.

Plug 16 includes a first end 16a, a second end 16b and extends along a longitudinal axis $L_P$. As illustrated, retainer 14 may be molded within plug 16 such that first end 14a is positioned adjacent first end 16a and second end 14b is positioned adjacent second end 16b. Additionally, longitudinal axis $L_P$ may be aligned with longitudinal axis $L_R$ of longitudinal portion 66 of retainer 14. Plug 16 includes a front surface 40, a back surface 42, a first end surface 44 and a second end surface 46. As illustrated, socket 30 may extend from retainer 14 out front surface 40 of plug 16 to allow access to the socket by a user. Additionally, front surfaces 60a and 62a of bushings 60 and 62 may be aligned and coplanar with front surface 40 of plug 16, and back surface 60b and 62b of bushings 60 and 62 may be aligned and coplanar with back surface 42 of plug 16, such that the bushings define mounting holes extending through the plug to allow for mounting of the plug as desired. In the illustrated embodiment, end surfaces 44 and 46 define entrance holes 48 and 50 molded about wire sets 26 and 28, respectively. However, it should be appreciated that components of electric circuit 12 may enter plug 16 at other locations as would occur to one skilled in the art. Plug 16 may optionally include a raised front portion 32 along front surface 40. In such embodiments, front end 30a of socket 30 extends through raised front portion 32 to allow access to the socket, as best viewed in FIG. 5.

Figure 4:
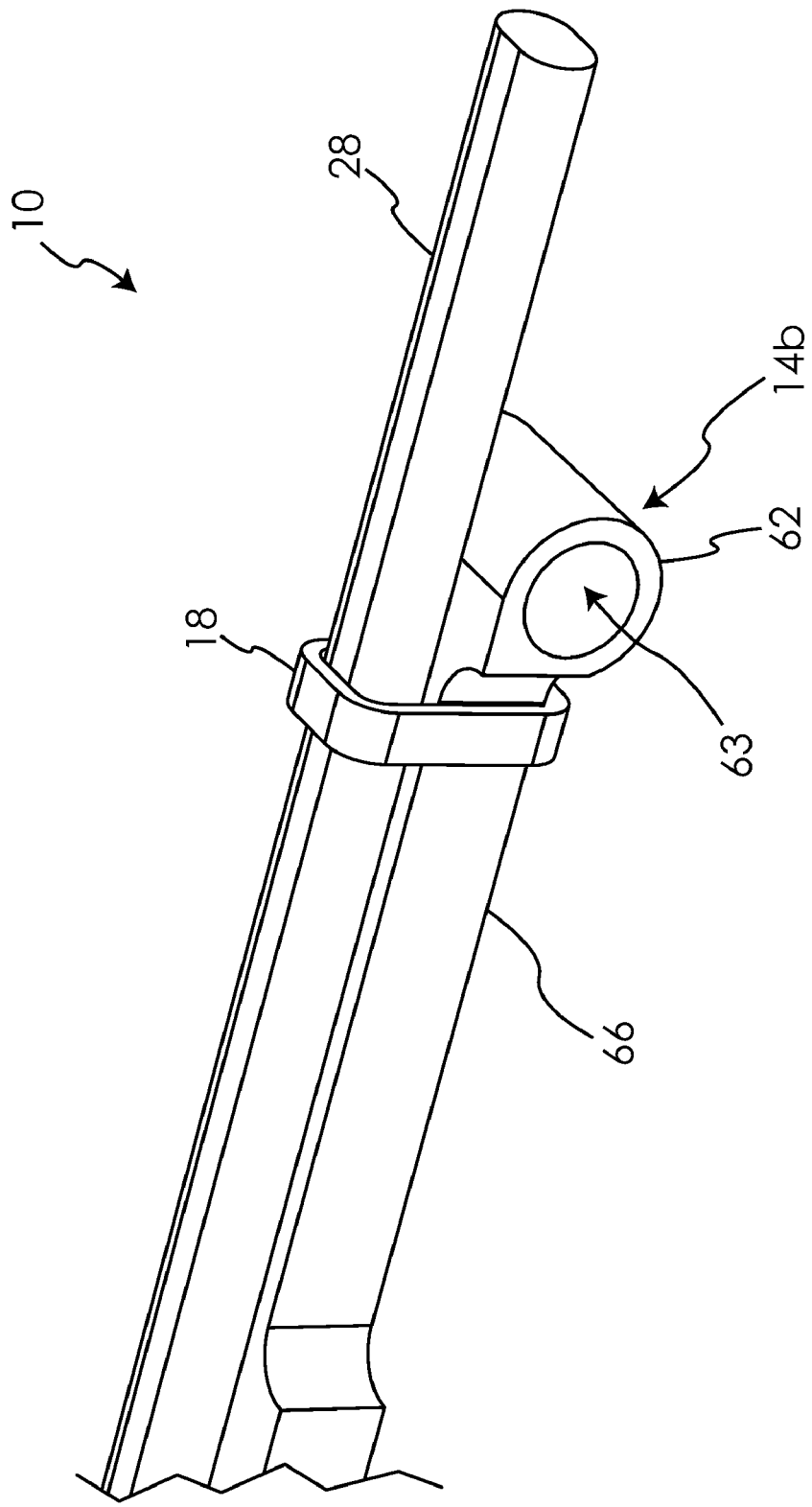
FIG. 4 is perspective view of components of the molded assembly according to the embodiment of FIG. 2.
Figure 5:
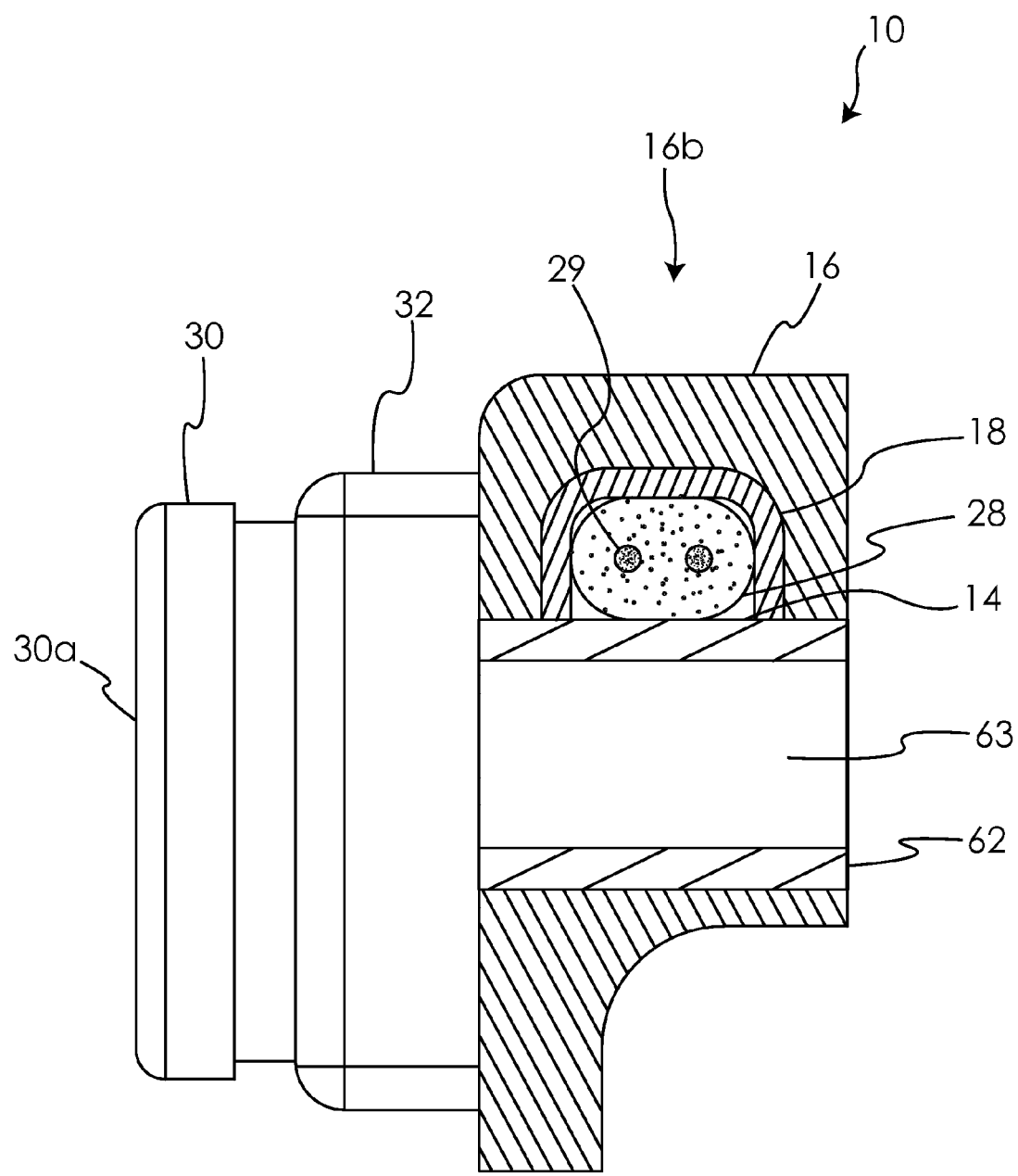
FIG. 5 is a side, partial cross-sectional view of the molded assembly according to the embodiment of FIG. 2.

Wire ties 18 may be used to secure wire sets 26 and 28 to retainer 14 adjacent built-in bushings 60 and 62 along longitudinal portion 66, as best seen in FIG. 4. In other embodiments, electric circuit 12 can be secured and held in place via wire crimps, wire clips, pieces of tape or various other securing members as would occur to one skilled in the art. In the illustrated embodiment, electric circuit 12 is secured to retainer 14 at two locations via two securing members. However, it should be appreciated that electric circuit 12 could be secured to retainer 14 in other manners, at other locations, and through the use of more or less than two securing members.

Referring generally to FIGS. 1-5, the methods and operations involving system 10 will be described hereafter. Electric circuit 12 is initially secured to retainer 14. In certain embodiments, circuit 12 may be permanently secured to retainer 14. Circuit 12 may be secured via wire ties 18 as described above; however, as previously noted, electric circuit 12 may be secured to retainer 14 in various other manners as would occur to one skilled in the art. Wire sets 26 and 28 may be positioned such that they are generally aligned with retainer 14, with wire set 26 adjacent first end 14a and wire set 28 adjacent second end 14b. Additionally, wires 29 within wire sets 26 and 28 may be operably connected with back end 30b of socket 30 either before or after circuit 12 is secured to retainer 14. Optionally, socket 30 may also be secured to retainer 14 as described above.

The electric circuit 12 secured to retainer 14, along with socket 30, are then placed within the mold cavity of a typical die mold (not shown). In certain embodiments, the die mold includes upper and lower die mold components. Wire sets 26 and 28 may extend into the die mold cavity, accordingly having portions positioned within the die mold cavity and portions positioned outside of the cavity. The die mold components are configured to form a molded item, such as the illustrated plug 16. It is contemplated that various other molded items could be created utilizing retainer 14. Additionally, the die mold may be configured such that front end surfaces 60*a* and 62*a* and back surfaces 60*b* and 62*b* of bushings 60 and 62 contact inner surfaces of the die mold components, so that the bushings define holes in the molded plug to mount the plug via mounting fasteners. In certain embodiments, the die mold may also be configured such that a portion of socket 30 extends out of the die mold cavity so that the same portion extends out the front surface of the molded item.

Upon proper positioning of the components within the mold cavity, the components are then overmolded to create a molded item. In certain embodiments, the upper and lower die mold components are brought together and a molten plastic material is injected into the die mold cavity according to a typical molding process. In certain embodiments, a polyvinylchloride material is injected into the die mold cavity, creating a molded item such as plug 16 composed of polyvinylchloride. However, it is contemplated that other materials and/or compositions thereof may be used as desired in creating molded plug 16. As illustrated, the die mold forms the molded plug 16 with wire sets 26 and 28 extending into molded plug 16 and forming entrance holes 48 and 50 as a result of the molding process.

Molded plug 16 may be mounted by inserting mounting fasteners such as bolts 70 and 72 through holes 61 and 63 defined by built-in bushings 60 and 62. The fasteners are tightened to mount the plug 16 as desired. The bushings 60 and 62 assist in preventing compression of the molded plug 16 upon tightening of the fasteners, and help maintain the shape and integrity of the plug.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. An apparatus, comprising:
    an electric circuit comprising a first electric circuit portion and a second electric circuit portion;
    a wire retainer configured to hold the first electric circuit portion in a fixed position with respect to the second electric circuit portion while being molded within a molded item during an overmolding process, the retainer having a first end and an opposite second end, wherein the retainer includes a first bushing extending along a first width axis and configured to define a mounting hole for the molded item, wherein the bushing includes front and back surfaces configured to be aligned and substantially co-planar with the front and back surfaces of the molded item; and
    a first securing member configured to secure a portion of the electric circuit to the retainer and hold the electric circuit in a fixed position during the overmolding process, such that the first electric circuit portion cannot move with respect to the second electric circuit portion.

2. The apparatus of claim 1, comprising a second securing member configured to secure a portion of the electric circuit to the retainer and hold the electric circuit in a fixed position during the overmolding process.

3. The apparatus of claim 1, wherein the retainer includes a second bushing adjacent the second end of the retainer, the first bushing being adjacent the first end of the retainer, wherein the second bushing extends along a second width axis and is configured to define a second mounting hole for the molded item, wherein the retainer includes a longitudinal portion extending between the first and second bushings along a longitudinal axis, the first and second width axes being substantially perpendicular to the longitudinal axis of the longitudinal portion.

4. The apparatus of claim 2, wherein the first and second securing members are wire ties configured to wrap around the retainer and the electric circuit to securely maintain the connection between the electric circuit and the retainer.

5. The apparatus of claim 2, wherein the first and second securing members are sections of tape configured to wrap around the retainer and the electric circuit to securely maintain the connection between the electric circuit and the retainer.

6. The apparatus of claim 2, wherein the first and second securing members are wire crimps configured to connect the electric circuit to the retainer to securely maintain the connection between the electric circuit and the retainer.

7. The apparatus of claim 2, wherein the first and second securing members are molded to the retainer.

8. The apparatus of claim 2, wherein the first and second securing members are integral components of the retainer.

* * * * *